US008482896B2

(12) United States Patent
Grewe et al.

(10) Patent No.: US 8,482,896 B2
(45) Date of Patent: Jul. 9, 2013

(54) OVERVOLTAGE PROTECTION ELEMENT

(75) Inventors: Christina Grewe, Detmold (DE); Andreas Metzger, Detmold (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 349 days.

(21) Appl. No.: 12/823,387

(22) Filed: Jun. 25, 2010

(65) Prior Publication Data

US 2010/0328829 A1 Dec. 30, 2010

(30) Foreign Application Priority Data

Jun. 25, 2009 (DE) ......................... 10 2009 030 629

(51) Int. Cl.
*H02H 1/00* (2006.01)
*H02H 3/20* (2006.01)
*H02H 3/22* (2006.01)

(52) U.S. Cl.
USPC ........................... 361/127; 361/91.1; 361/111

(58) Field of Classification Search
USPC ........................................ 361/127, 111, 91.1
See application file for complete search history.

(56) References Cited

U.S. PATENT DOCUMENTS 4,168,514 A 9/1979 Howell
4,188,561 A 2/1980 Pranke et al.
6,040,971 A 3/2000 Martenson et al.
6,275,136 B1 8/2001 Yamaguchi
7,330,098 B2 * 2/2008 Yoshikawa .................... 337/416
7,411,769 B2 8/2008 Schimanski et al.
2005/0231872 A1 * 10/2005 Schimanski et al. ......... 361/91.1

FOREIGN PATENT DOCUMENTS

DE 36 32 224 A1 4/1988
DE 42 41 311 C2 6/1995
DE 695 03 743 T2 3/1999
EP 0 716 493 B1 7/1998

* cited by examiner

*Primary Examiner* — Jared Fureman
*Assistant Examiner* — Lucy Thomas
(74) *Attorney, Agent, or Firm* — Roberts Mlotkowski Safran & Cole, P.C.; David S. Safran

(57) ABSTRACT

An overvoltage protection element with a housing, at least one overvoltage limiting component in the housing, especially a varistor, and two connecting elements for electrically connecting the overvoltage protection element to a current or signal path in a normal state, the connecting elements being in electrically conductive contact with a respective pole of the overvoltage limiting component. In the normal state of the overvoltage protection element, at least one pole is connected to a connecting element via a plug-and-socket connection, and at least one spring is located between the housing and the overvoltage limiting component such that, when the overvoltage limiting component is thermally overloaded, it is turned by the spring separating the at least one pole from the assigned connecting element, and creating a thermally separating connection between the overvoltage limiting component and the housing when the temperature of the overvoltage limiting component exceeds a given boundary temperature.

14 Claims, 3 Drawing Sheets

OVERVOLTAGE PROTECTION ELEMENT

BACKGROUND OF THE INVENTION

1. Field of the Invention

The invention relates to an overvoltage protection element with a housing, at least one overvoltage limiting component which is located in the housing, especially a varistor, and with two connecting elements for electrical connection of the overvoltage protection element to the current path or signal path to be protected, in the normal state of the overvoltage protection element, the connecting elements each being in electrically conductive contact with one pole of the overvoltage limiting component.

2. Description of Related Art

German Patent DE 42 41 311 C2 discloses an overvoltage protection element which has a thermal disconnector for monitoring the state of a varistor. In this overvoltage protection element, the first connecting element is connected via a flexible conductor to a rigid disconnection element whose end facing away from the flexible conductor is connected via a solder point to a terminal lug provided on a varistor. The other connecting element is permanently connected to the varistor or the terminal lug on the varistor via a flexible conductor. The disconnection element is exposed to a force from a spring system which leads to the disconnection element being moved linearly away from the terminal lug when the solder connection is broken so that the varistor is electrically isolated when thermally overloaded. By way of the spring system, when the solder connection is broken, a telecommunications contact is activated at the same time so that remote monitoring of the state of the overvoltage protection element is possible.

German Utility Model DE 20 2004 006 227 U1 corresponds to U.S. Pat. No. 7,411,769 B2 discloses an overvoltage protection element in which the state of a varistor is monitored according to the principle of a temperature switch so that, when the varistor is overheated, the solder connection which is provided between the varistor and the disconnection element is broken; this leads to electrical isolation of the varistor. Moreover, when the solder connection is broken, a plastic element is pushed by the reset force of a spring out of a first position into a second position in which the disconnection element, which is made as an elastic metal tongue, is thermally and electrically isolated from the varistor by the plastic element so that an arc which may arise between the metal tongue and the contact site of the varistor is extinguished. Since the plastic element has two colored markings located next to one another, it also acts, at the same time, as a visual indicator of the state, so that the state of the overvoltage protection element can be easily read off directly on site.

German Patent DE 695 03 743 T2 corresponds to EP 0 716 493 B1 discloses an overvoltage protection element with two varistors, which has two disconnection means which can individually isolate the varistors each on their live end. The disconnection means each have one elastic disconnection tongue, the first end of the disconnection tongue being permanently connected to the first terminal and the second end of the disconnection tongue in the normal state of the overvoltage protection element being attached to a connecting tongue on the varistor by way of a solder site. If unallowable heating of the varistor occurs, this leads to melting of the solder connection. Since the disconnection tongue in the soldered-on state (normal state of the overvoltage protection element) is deflected out of its rest position and is thus pretensioned, the free end of the disconnection tongue when the solder connection softens moves away from the connecting tongue of the varistor, by which the varistor is electrically isolated. In order to ensure the required insulation and tracking resistance and to extinguish an arc which forms when the gap opens, when the disconnection tongue is pivoted, it is necessary that a distance as great as possible is achieved between the second end of the disconnection tongue and the connecting tongue of the overvoltage limiting component.

The known overvoltage protection elements are generally made as “protective plugs” which together with the bottom part of the device form an overvoltage protection device. For installation of such an overvoltage protection device which, for example, is designed to protect the phase-routing conductors and the neutral conductor, and optionally, also the ground conductor, in the known overvoltage protection devices, on the bottom part of the device, there are the corresponding terminals for the individual conductors. For simple mechanical and electrical contact-making of the lower part of the device with the respective overvoltage protection element, in the overvoltage protection element, the connecting elements are made as plug pins for which there are corresponding sockets which are connected to the terminals in the lower part of the device so that the overvoltage protection element can be easily plugged onto the bottom part of the device.

In these overvoltage protection devices, installation and mounting can be carried out very easily and in a time-saving manner due to the capacity of the overvoltage protection elements to be plugged in. In addition, these overvoltage protection devices in part still have a changeover contact as the signaler for remote indication of the state of at least one overvoltage protection element and an optical state display in the individual overvoltage protection elements. It is indicated by way of the state display whether the overvoltage limiting component which is located in the overvoltage protection element is still serviceable or not. The overvoltage limiting component here is especially varistors, but depending on the application of the overvoltage protection element gas-filled surge arresters, spark gaps or diodes can also be used.

The above described thermal isolation devices which are used in the known overvoltage protection elements and which are based on melting of a solder connection must perform several functions. In the normal state of the overvoltage protection element, i.e., in the state in which it is not disconnected, a reliable and good electrical connection between the first connecting element and the overvoltage limiting component must be ensured. When a certain boundary temperature is exceeded, the gap must ensure reliable isolation of the overvoltage limiting component and continuous insulation resistance and tracking resistance. However, the problem here is that the solder connection is continuously loaded with a shear stress as a result of the spring force of the spring element or of the disconnection tongue which has been deflected out of its rest position in the normal state of the overvoltage protection element.

SUMMARY OF THE INVENTION

A primary object of this invention is, therefore, to provide an overvoltage protection element of the initially described type in which the aforementioned disadvantages are avoided, i.e., both a reliable and good electrical connection in the normal state and also reliable isolation of a defective overvoltage limiting component will be ensured and an insulation and tracking resistance as high as possible will be achieved, even with a size of the overvoltage protection element that is as small as possible.

This object is achieved in an overvoltage protection element of the initially described type in that the overvoltage limiting component is pivotally mounted in the housing, in the normal state of the overvoltage protection element at least one pole of the overvoltage limiting component being connected to one connecting element via a plug-and-socket connection. Moreover, at least one spring element is located between the housing and the overvoltage limiting component such that the overvoltage limiting component when thermally overloaded is turned by the spring element such that at least one pole is no longer in electrically conductive contact with the assigned connecting element. So that, in the overvoltage protection element in accordance with the invention, the two poles of the overvoltage limiting component, in the normal state of the overvoltage protection element, are in electrically conductive contact with the connecting elements against the spring force of the spring element, and between the overvoltage limiting component and the housing, there is a thermally separating connection which separates when the temperature of the overvoltage limiting component exceeds a given boundary temperature. In the normal state of the overvoltage protection element, this connection between the overvoltage limiting component and the housing prevents rotation of the overvoltage limiting component so that the connecting elements are each in electrically conductive contact with one pole of the overvoltage limiting component.

While in the overvoltage protection elements known from the prior art the solder site which is used in the normal state of the overvoltage protection element of the electrical connection between the first connecting element and one pole of the overvoltage limiting component is always loaded with a shear stress due to the spring force of a spring element, which can lead to deterioration of the electrical connection, in the overvoltage protection element in accordance with the invention, the connection between the connecting elements and the poles of the overvoltage limiting component is not loaded by a spring force.

Fixing of the overvoltage limiting component in the contact position takes place in the overvoltage protection element in accordance with the invention by the thermally separating connection which is formed between the overvoltage limiting component and the housing. Thus, the spring force of the spring element in the normal state of the overvoltage protection element does not act on the electrical connection sites of the overvoltage limiting component, but on the connection between the component and the housing which is made separately from it. The spring element can be both a compression spring as well as a tension spring. Of course, a compression spring and a tension spring can also be used.

According to one preferred configuration of the invention, the thermally separating connection between the overvoltage limiting component and the housing is implemented by a retaining element which is located in the housing and which, in the normal state of the overvoltage protection element, prevents rotation of the overvoltage limiting component. The retaining element is made of a material which melts when the temperature of the overvoltage limiting component exceeds a given boundary temperature. Arranging the retaining element in direct contact with or in the immediate vicinity of the overvoltage limiting component ensures that heating of the overvoltage limiting component also leads to heating of the retaining element so that the retaining element melts when the given boundary temperature is reached. This then leads to the pivotally supported overvoltage limiting component being turned by the spring element, by which the plug-and-socket connection which has been implemented between at least one pole and one connecting element is separated; this causes electrical isolation of the overvoltage limiting component.

A correspondingly suitable plastic which melts starting at a temperature of roughly 110° C. to 130° C. is used for the retaining element. Especially polyethylene is suitable for this purpose, preferably low density polyethylene (LDPE) or high density polyethylene (HDPE) and polycarbonate (PC). However, other materials are also usable for implementation of the retaining element. Moreover, instead of one retaining element, there can also be several retaining elements, especially two retaining elements between the housing and the overvoltage limiting component.

It was stated above that, in the normal state of the overvoltage protection element, at least one pole of the overvoltage limiting component is connected to a connecting element via a plug-and-socket connection. According to a first configuration of the overvoltage protection element in accordance with the invention, the second pole is also connected to the second connecting element via a plug-and-socket connection, the two poles each being connected to a respective terminal lug in an electrically conductive manner. The terminal lugs are preferably made as plug pins which are inserted into the connecting elements which are made as sockets, especially as tulip-shaped contact forks in the normal state of the overvoltage protection element. In this connection, it is especially easily possible to establish an electric connection which can carry a surge current between the terminal lugs and the connecting elements. If undue heating of the overvoltage limiting component occurs, this leads to heating of at least one retaining element so that it melts and thus the overvoltage limiting component is turned by the spring element, as a result of which the two terminal lugs are pulled out of the sockets.

The formation of two plug-and-socket connections leads to there also being two gaps. In this way, the extinguishing of an arc which may occur on the gaps is promoted since the two gaps form a series connection so that the overall arc length and thus also the arc voltage are increased by the series connection of the two gaps.

In one alternative configuration of the overvoltage protection element in accordance with the invention, a plug-and-socket connection is made only between one pole of the overvoltage limiting component and the connecting element, this pole likewise being connected to a terminal lug in an electrically conductive manner. In this regard, the terminal lug is preferably made as a plug pin, then the connecting element being made on the side facing the terminal lug as a socket. The second pole of the overvoltage limiting component in this configuration is electrically connected to the second connecting element, not by way of a plug-and-socket connection, but by way of a rotary connection.

Preferably, the second pole of the overvoltage limiting component is connected to a pivot and the respective second connecting element on the side facing the pivot is connected to the corresponding rotary support arrangement. The execution of a rotary connection between the second pole of the overvoltage limiting component and the second connecting element makes it possible for the overvoltage limiting component to be turned by the spring element when the latter component is thermally overloaded. In this configuration, in case of damage to the overvoltage limiting component, only one pole is separated from the connecting element, while the other pole is still connected to the connecting element by way of a rotary connection.

In order to ensure high insulation and tracking resistance and to extinguish the arc which arises when the gap opens, i.e., when the plug-and-socket connection between at least one pole and at least one connecting element is broken, a distance as large as possible between the pole or poles and the respective connecting element must be achieved. For this purpose, it is however not necessary in the overvoltage protection element in accordance with the invention that its dimensions be increased since the desired distance can be achieved by a corresponding broad rotation of the overvoltage limiting component.

The overvoltage protection element in accordance with the invention is advantageously made as a "protective plug" so that together with the corresponding bottom part of the device it forms an overvoltage protection device. Advantageously, the bottom part of the device has a telecommunication contact for remote indication of the state of the overvoltage protection element. For actuating a switch which belongs to the telecommunications contact, in the overvoltage protection element, there is a tripping pin which projects through an opening in the bottom of the housing. The tripping pin can be connected to the overvoltage limiting component such that when electrical contact is broken between at least one pole of the overvoltage limiting component and the connecting element it is pushed with the overvoltage limiting component, by which the telecommunications contact located in the bottom of the device is actuated.

In particular, there are now a host of possibilities for embodying and developing the overvoltage protection element in accordance with the invention. Reference is made in this respect to the following description of preferred exemplary embodiments in conjunction with the accompanying drawings.

DETAILED DESCRIPTION OF THE INVENTION

Figure 1:
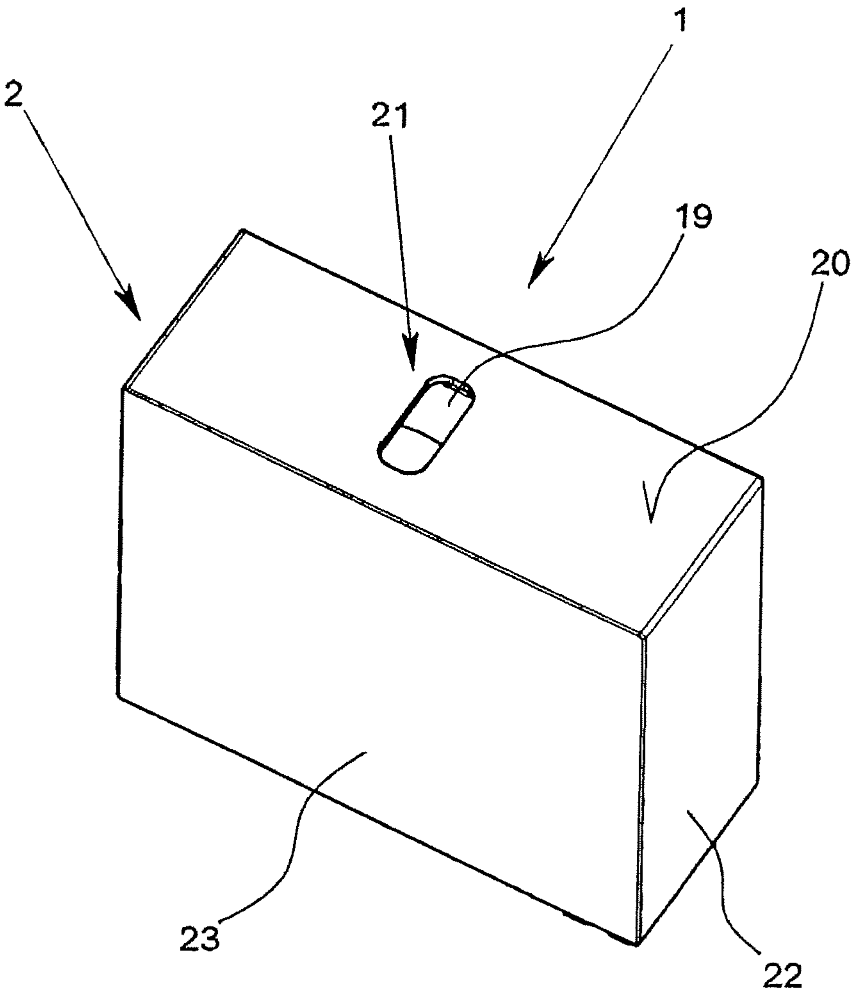
FIG. 1 is a perspective of one exemplary embodiment of an overvoltage protection element, obliquely from overhead.

The figures show an overvoltage protection element 1 with a housing 2 in the which there is an overvoltage limiting component 3. In the illustrated exemplary embodiments, the overvoltage limiting component is a varistor 3; alternatively, for example, a gas-filled surge arrester can also be used as an overvoltage limiting component 3. The overvoltage protection element 1, which is made as a "protective plug", has two connecting elements 4, 5 which are made as sockets and which can be plugged onto the corresponding plug pins of the lower part of the device (shown here).

Figure 2:
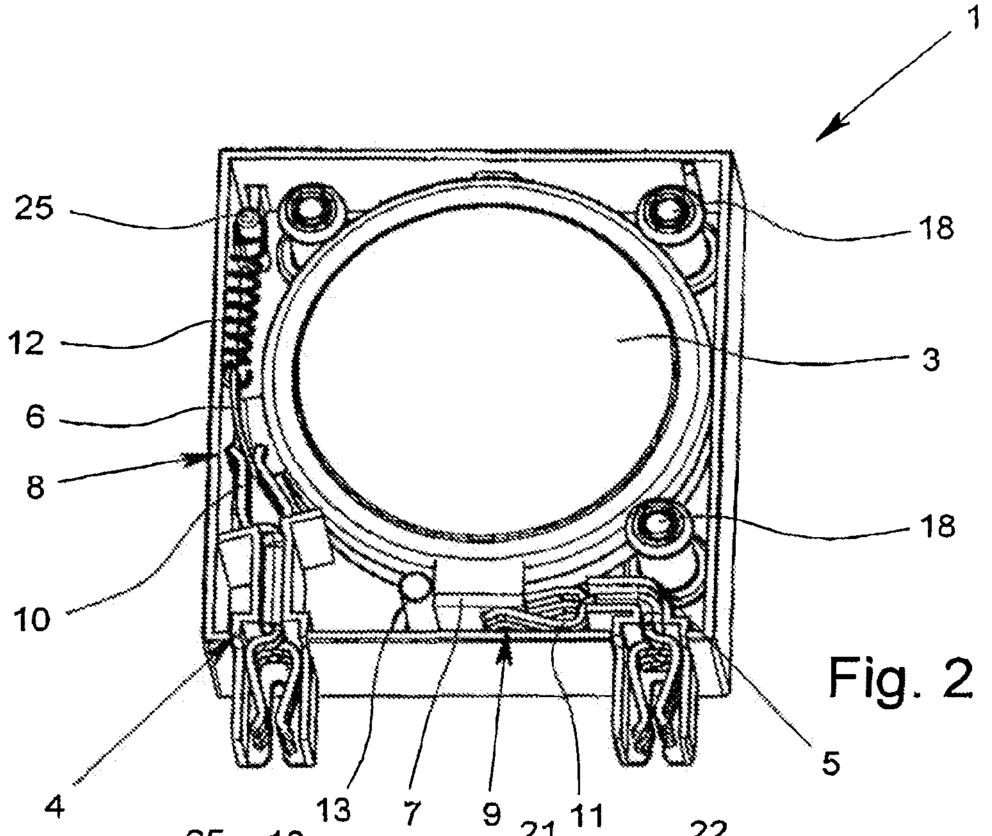
FIG. 2 shows one exemplary embodiment of the overvoltage protection element in accordance with the invention, in the normal state, with the housing cover removed.
Figure 3:
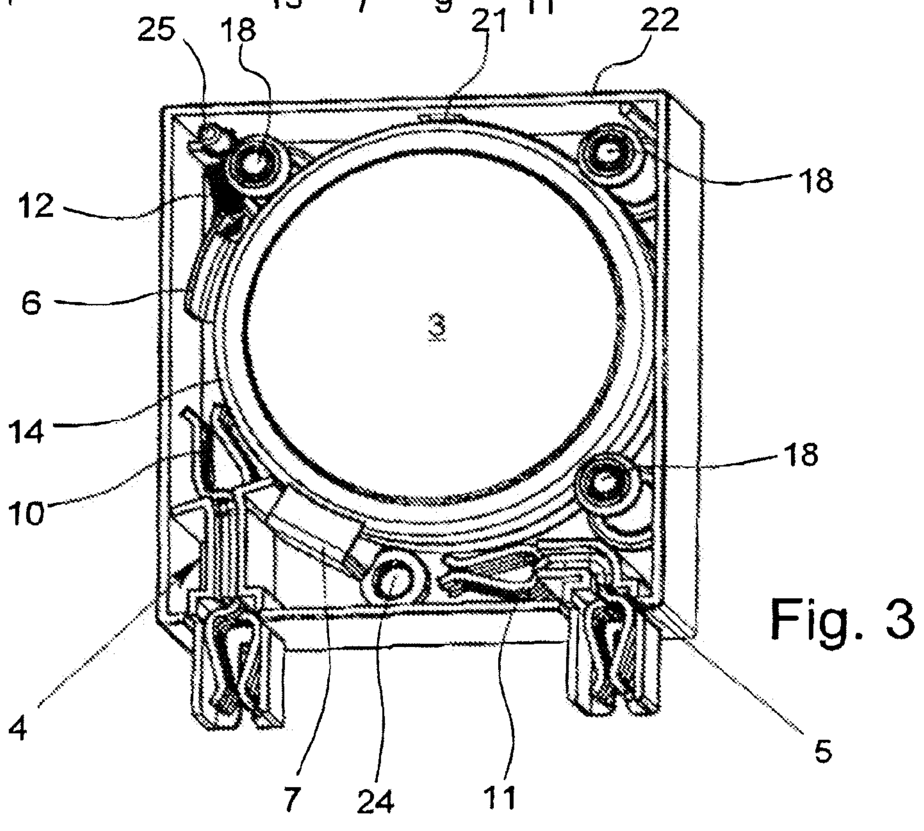
FIG. 3 shows the overvoltage protection element as shown in FIG. 2, with an electrically isolated varistor.

In the exemplary embodiment as shown in FIGS. 2 and 3, the two poles of the varistor 3 are each connected to a terminal lug 6, 7. In the normal state of the overvoltage protection element 1, the varistor 3 is connected to the two connecting elements 4, 5 via the two terminal lugs 6, 7. The connection between the two terminal lugs 6, 7 and the two connecting elements 4, 5 follows by way of a plug-and-socket connection 8, 9 which can carry a surge current, for which the ends of the connecting elements 4, 5 facing the terminal lugs 6, 7 are made as tulip-shaped jacks 10, 11.

In addition to the varistor 3 which is pivotally located in the housing 2 and the two connecting elements 4, 5, there are another spring element 12 and a retaining element 13 in the housing 2. The spring element 12 is located between the housing 2 and the varistor 3 or the terminal lug 6 of the varistor 3 such that varistor 3, when thermally overloaded, is turned by the spring element 12 such that the two terminal lugs 6, 7, are pulled out of the jacks 10, 11 (compare FIGS. 2 & 3) so that the two poles of the varistor 3 are no longer in electrically conductive contact with the assigned connecting elements 4, 5; the varistor 3 is electrically isolated.

The retaining element 13 prevents the varistor 3 from being turned in the normal state of the overvoltage protection element 1 as a result of the force of the spring element 12. The retaining element 13 thus prevents rotation of the varistor 3 as long as the varistor 3 has not exceeded a certain boundary temperature. As a result of the arrangement of the retaining element 13 with direct contact to the varistor 3, heating of the varistor 3 also leads to heating of the preferably plastic retaining element 13. The retaining element 13 is made such that when the boundary temperature is reached, generally between 110° C. and 130° C., it melts so that the varistor 3 is no longer kept in its position by the retaining element 13, but is rotatted as a result of the spring force of the spring element 12.

As is apparent from a comparison of FIGS. 2 and 3 which show the overvoltage protection element 1 once in the normal state (FIG. 2) and with an electrically isolated varistor 3 (FIG. 3), the varistor 3 is turned by the spring element 12, in the illustrated exemplary embodiments clockwise, such that the two terminal lugs 6, 7 are pulled out of the jacks 10, 11. In the isolated state of the varistor 3 (FIG. 3), in which the tension spring 12 is relieved, the distance between the terminal lugs 6, 7 and the respective jacks 10, 11 is so large that an arc which may form when the plug-and-socket connection 8, 9 is separated is interrupted.

In the first exemplary embodiment of the overvoltage protection element 1 in accordance with the invention, shown in FIGS. 2 & 3, in which the two poles of the varistor 3 are each connected in an electrically conductive manner to a respective terminal lug 6, 7, the two terminal lugs 6, 7 are both located on the outer periphery 14 of the varistor 3, as a result of which its production, especially the jacketing process of the varistor 3 with insulating jacketing, is simplified. Moreover, a very flat construction of the varistor 3, and thus, of the overvoltage protection element 1, is altogether attainable.

Figure 4:
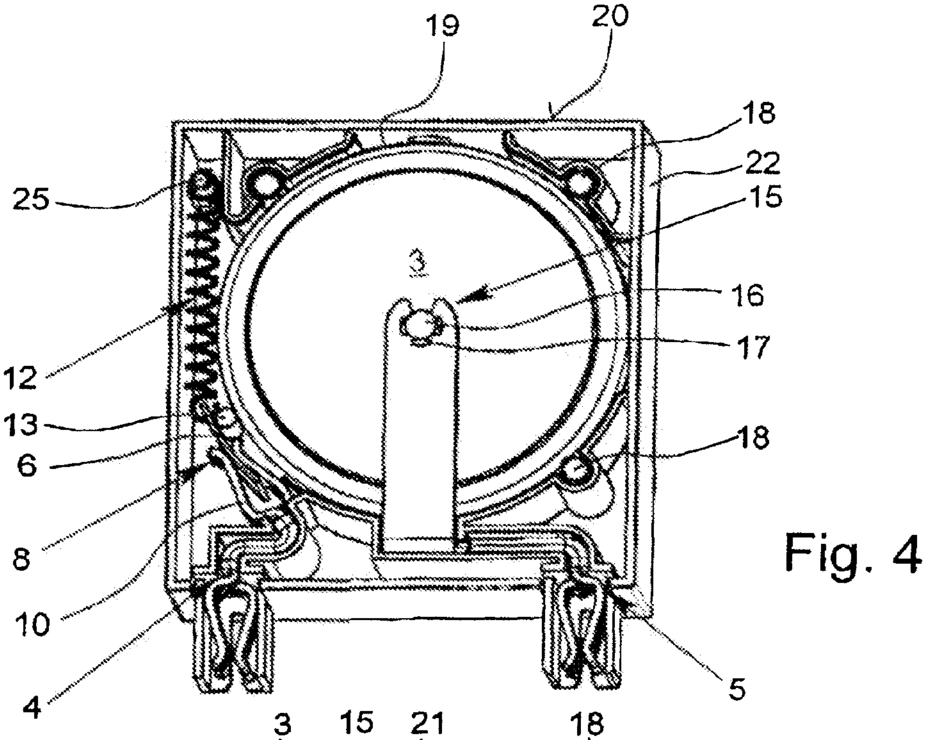
FIG. 4 shows a second exemplary embodiment of the overvoltage protection element in accordance with the invention, in the normal state, with the housing cover removed.
Figure 5:
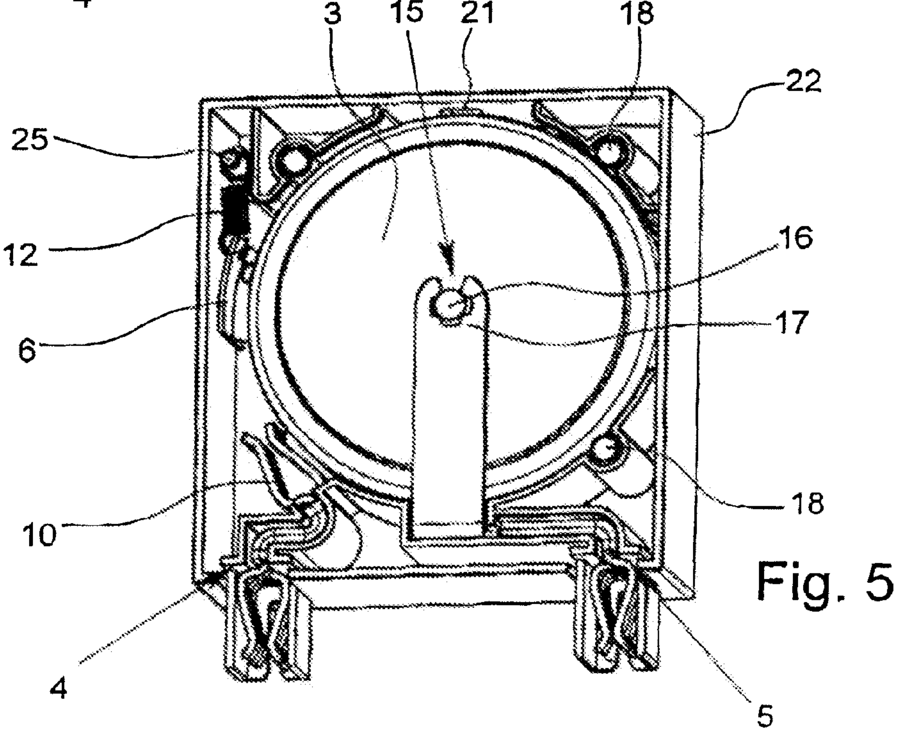
FIG. 5 shows the overvoltage protection element as shown in FIG. 4, with an electrically isolated varistor.

In the exemplary embodiment of the overvoltage protection element 1 as shown in FIGS. 4 and 5, only one pole of the varistor 3 is connected in an electrically conductive manner to the terminal lug 6 which in the normal state of the overvoltage protection element 1 (FIG. 4) is connected in an electrically conductive manner to a connecting element 4 by way of a plug-and-socket connection 8. Between the second pole of the varistor 3 and the second connecting element 5, conversely, a rotary connection 15 is implemented, for which the second pole of the varistor 3 is connected to a pivot 16 and the respective second connecting element 5 is connected to the corresponding rotary support 17. In this exemplary embodiment, in the normal state of the overvoltage protection element 1, unwanted rotation of the varistor 3 due to the spring force of the spring element 12 is prevented by a retaining element 13 which is made and attached in the housing 2 such that it prevents rotation of the varistor 3 as long as the retaining element 13 is not heated to such an extent that it melts, due to the heating of the varistor 3.

In the exemplary embodiment as shown in FIGS. 4 & 5, the pivoting of the varistor 3 in the housing 2 takes place by the support of the pivot 16 in the rotary support 17. Moreover, in the two exemplary embodiments, there are several roller bearings 18 in the housing 2 such that the varistor 3 can be turned with low frictional resistance by the spring element 12 when the retaining element 13 is melted and thus no longer counteracts the spring force of the spring element 12.

To display the state of the varistor 3 or of the overvoltage protection element 1 there is an optical state display 19 which is applied as a color coating or colored film directly to the outer periphery 14 of the varistor 3. In the top 20 of the housing 2 for this purpose a viewing window 21 is made through which, depending on the rotary position of the varistor 3, a differently colored section of the state display 19 is apparent. Preferably the section of the state display 19 which is visible through the viewing window 21 (FIG. 1) in the normal state of the overvoltage protection element 1 is green, while the section of the state display 19 which is visible through the viewing window 21 in the isolated state of the varistor 3 is colored red.

In particular, FIG. 1 shows that the housing 2 is made in two parts, specifically a shell-shaped or pot-shaped first housing part 22 and a second housing part 23 which is made as a cover. In the first housing part 22 are the varistor 3, the connecting elements 4, 5, the spring element 12, the retaining element 13 and the roller bearings 18, while the second housing part 23 is used only for closing the housing 2.

The overvoltage protection element in accordance with the invention can be easily mounted by first the roller bearing 18 and the varistor 3 as well as the connecting elements 4, 5 being inserted into the first housing part 22. Here, the spring element 12 is first attached only at one end to the terminal lug 6 of the varistor 3. Accordingly, the varistor 3 is turned in the housing 2 such that the terminal lug 6—in the exemplary embodiment shown in FIGS. 4 and 5—or the two terminal lugs 6, 7—in the exemplary embodiment shown in FIGS. 2 and 3—are inserted between the jack 10 or the jacks 10 and 11. Then, the retaining element 13 is inserted into a receiver 24 which is provided for this purpose in the housing part 22, as a result of which the varistor 3 is locked in its position. As result, the spring element 12 is tensioned and suspended on a mounting pin 25 which is made, likewise, in the housing part 22, at a second end. Last, the cover 23 is connected to the housing part 22, by which the housing 2 is closed.

What is claimed is:

1. Overvoltage protection element, comprising:

a housing, at least one overvoltage limiting component which is located in the housing, and two connecting elements for electrical connection of the overvoltage protection element to a current or signal path to be protected, wherein, in a normal state of the overvoltage protection element, each of the connecting elements is in electrically conductive contact with a respective pole of the overvoltage limiting component, wherein the overvoltage limiting component is pivotally mounted in the housing, wherein, in the normal state of the overvoltage protection element at least one pole of the overvoltage limiting component is connected to the respective connecting element via a plug-and-socket connection, wherein at least one spring element is located between the housing and the overvoltage limiting component such that, when the overvoltage limiting component is thermally overloaded the spring element rotates the overvoltage limiting component in a manner causing at least one pole of the overvoltage limiting component to be removed from electrically conductive contact with the respective connecting element, wherein a thermally separating connection is provided between the overvoltage limiting component and the housing in a manner which prevents rotation of the overvoltage limiting component in the normal state of the overvoltage limiting component, and wherein the thermally separating connection separates when the temperature of the overvoltage limiting component exceeds a given boundary temperature.

2. Overvoltage protection element in accordance with claim 1, wherein there is at least one retaining element in the housing which, in the normal state of the overvoltage protection element prevents turning of the overvoltage limiting component as a result of spring force of the spring element, the retaining element being made of a material which melts when the temperature of the overvoltage limiting component exceeds said given boundary temperature.

3. Overvoltage protection element in accordance with claim 2, wherein the retaining element is made of a plastic which melts at a temperature of roughly 110° C. to 130° C.

4. Overvoltage protection element in accordance with claim 3, wherein said plastic is selected from the group consisting of polyethylene (PE), low density polyethylene (LDPE), high density polyethylene (HDPE), and polycarbonate (PC).

5. Overvoltage protection element in accordance with claim 1, wherein both poles of the overvoltage limiting component are connected in an electrically conductive manner to a respective terminal lug, and wherein, in the normal state of the overvoltage protection element, the poles of the overvoltage limiting component are connected to a connecting element by way of said plug-and-socket connection.

6. Overvoltage protection element in accordance with claim 5, wherein the overvoltage limiting component is disk-shaped and the terminal lugs are arranged at positions of the overvoltage limiting component which are offset by about 90° relative to one another.

7. Overvoltage protection element in accordance with claim 1, wherein a first pole of the overvoltage limiting component is connected in an electrically conductive manner to a terminal lug which, in the normal state of the overvoltage protection element, is connected by way of a plug-and-socket connection to a first connecting element, and wherein a second pole is connected by way of a rotary connection to a second connecting element.

8. Overvoltage protection element in accordance with claim 7, wherein the second pole of the overvoltage limiting component is connected to a pivot and the respective second connecting element is connected to a corresponding rotary support.

9. Overvoltage protection element in accordance with claim 1, wherein a plurality of roller bearings are provided in the housing for rotatably supporting the overvoltage limiting component.

10. Overvoltage protection element in accordance with claim 1, further comprising a visual, state indicating element and a viewing window in the top of the housing through which said state indicating element is visible.

11. Overvoltage protection element in accordance with claim 10, wherein the state indicating element is a color or colored film located on the overvoltage limiting component.

12. Overvoltage protection element in accordance with claim 11, wherein the color or colored film located on the outer periphery of the overvoltage limiting component.

13. Overvoltage protection element in accordance with claim 2, wherein the housing is made in two parts, a first housing part accommodating the overvoltage limiting component, the connecting elements, the spring element and the retaining element, and a second housing part being a cover for the first housing part.

14. Overvoltage protection element in accordance with claim 1, wherein said overvoltage limiting component is a varistor.

* * * * *